United States Patent [19]
Davenport et al.

[11] Patent Number: 4,749,156
[45] Date of Patent: Jun. 7, 1988

[54] LIFTING AERIAL LOAD SUSPENDING DEVICE

[76] Inventors: David C. Davenport, Rte. 14, Box 442, Cumming, Ga. 30130; David R. Clark, P.O. Box 699, Barre, Me. 01005

[21] Appl. No.: 867,817

[22] Filed: May 27, 1986

Related U.S. Application Data

[63] Continuation-in-part of Ser. No. 672,900, Nov. 19, 1984, abandoned.

[51] Int. Cl.⁴ .............................................. B64D 17/02
[52] U.S. Cl. .................................................... 244/145
[58] Field of Search ........................ 244/142, 145, 152

[56] References Cited

U.S. PATENT DOCUMENTS

| | | | |
|---|---|---|---|
| 3,258,546 | 11/1966 | Jalbert | 244/145 |
| 3,524,613 | 8/1970 | Reuter et al. | 244/142 |
| 3,893,641 | 7/1975 | Sutton | 244/145 |
| 4,175,722 | 11/1979 | Higgins | 244/145 |
| 4,389,031 | 6/1983 | Whittington | 244/145 |

FOREIGN PATENT DOCUMENTS 2502579 10/1982 France ........................... 244/145

Primary Examiner—Joseph F. Peters, Jr.
Assistant Examiner—Rodney Corl
Attorney, Agent, or Firm—James A. Hinkle

[57] ABSTRACT

A flexible, multicellular aerial device of significantly improved performance for the lifting or gliding of a load attached to and suspended from the device by suspension means that distribute load stresses over large areas of structural surface without the use of additional suspension load bearing reinforcing members or other externally applied load distributing means. The primary structure of the device is comprised of an upper and lower flexible surface between which a plurality of longitudinal flexible partitions of various vertical and longitudinal extent are attached at spanwise intervals to define a substantially airfoil-shaped ram pressurizable partitioned structure, to which a plurality of suspension and control lines attach at various points to suspend and control the lift or glide of a load through the atmosphere.

28 Claims, 10 Drawing Sheets

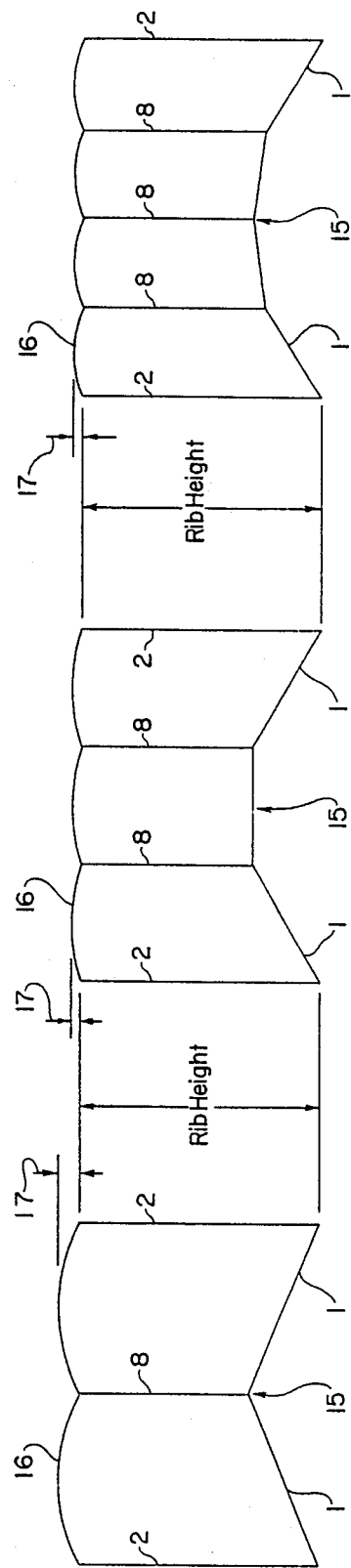

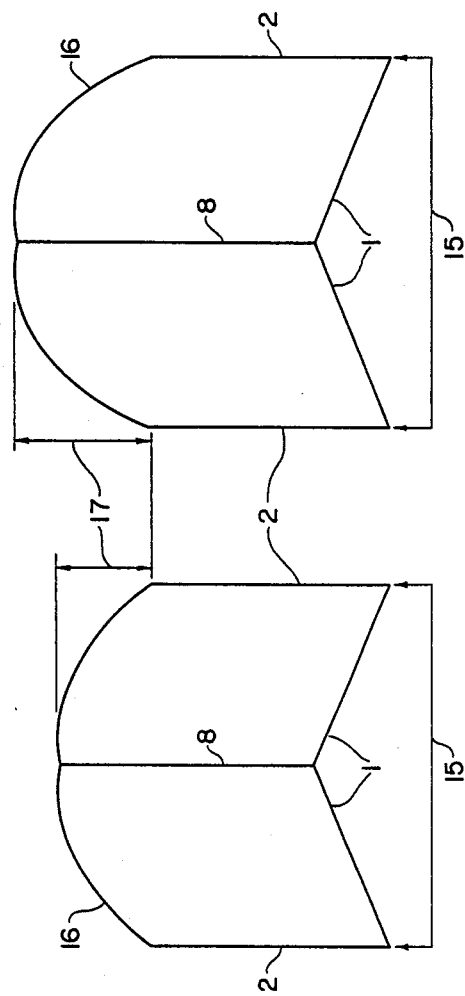

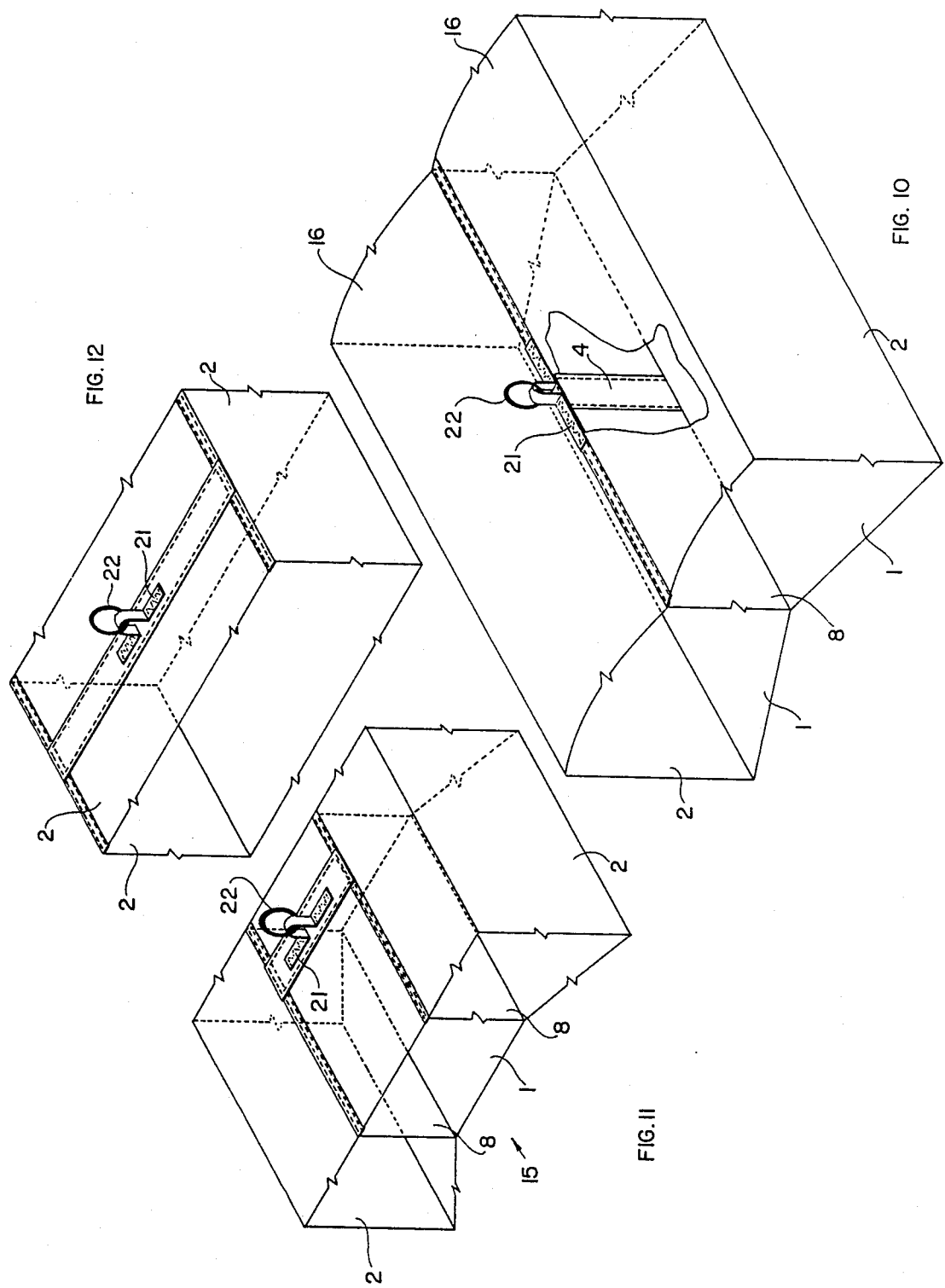

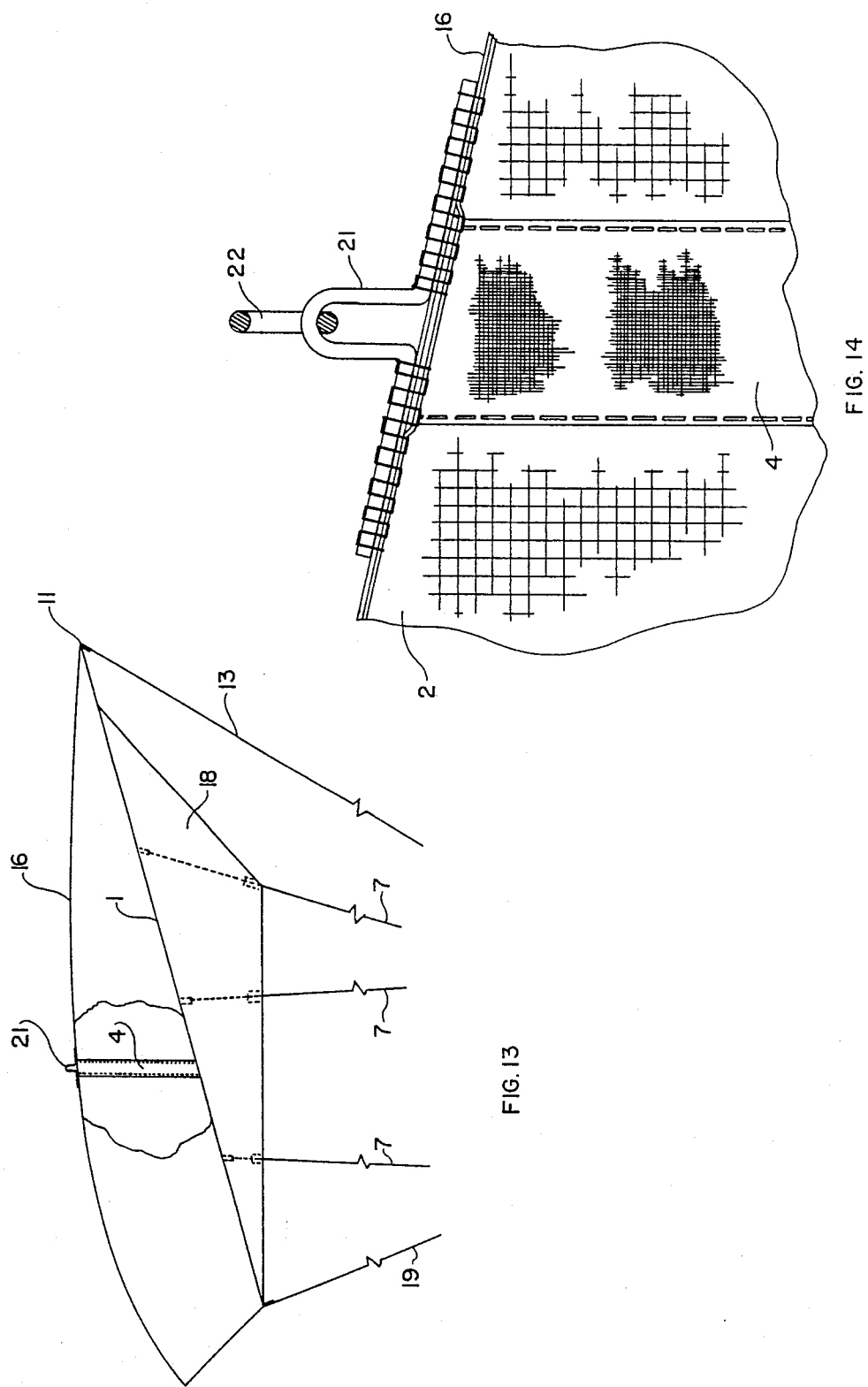

LIFTING AERIAL LOAD SUSPENDING DEVICE

This application is a continuation-in-part of our prior U.S. application Ser. No. 672,900, filed Nov. 19, 1984, abandoned.

BACKGROUND OF THE INVENTION

1. Field of the Invention

The invention relates to the field of lift-producing aerial devices used to stabilize or suspend loads in captive flight or to glide and maneuver loads in powered or unpowered free flight, such as instrumented payload lifting kites, sport and military personnel parachutes, automatically or remotely piloted cargo recovery systems, flexible wing ultralight powered aircraft, towed object stabilization devices, or related applications. Specifically, the invention significantly improves the construction and flight performance of such applications of the aerial device while decreasing the device's weight, bulk, complexity, and cost of manufacture.

Lift-producing aerial devices suitable for use in the aforementioned applications are generally well known in the prior art, as several improved devices and methods have been disclosed and publicly practiced during the last twenty-five years. Even so, the existing prior art devices share a commonality of disadvantages in construction that increase structural weight, bulk, complexity, and cost of manufacture by the employment of externally applied load distributing means and reinforcing members that serve to force focused load transmission along relatively small extents of structural surface. On prior art devices employing sewn textile flexible structures, the primary structural fabric is extensively perforated by the application of such external load distributing and reinforcing means, which serves to degrade structural integrity by producing excessive local stress concentrations in the primary structural fabric. These stress concentrations cause reduced tensile strength and fatigue tolerance and increases the structure's vulnerability to catastrophic failure, especially during use in applications requiring high-speed inflight deployment and inflation.

2. Description of the Prior Art

Early prior art in the field of circular parachutes intended primarily for vertical descent employed a commonality of well known load attachment and distributing means. Attached about the lower circumferential periphery of the circular parachute canopy were a plurality of evenly spaced externally applied reinforcing members attached to radially oriented canopy fabric seams which concurrently attached to a plurality of suspension lines of essentially vertical orientation and tangential to the lower peripheral surface of the canopy, intended for the transmission of suspended load stresses radially inward toward the center of the circular canopy structure. Representative of this commonality of means are the disclosures and narratives contained in U.S. Pat. Nos. 1,562,248 (Russell); 1,872,705 (Elliott); 2,511,263 (Hiscock); 2,520,931 (Heinrich); 2,527,553 (Ingels); 2,693,924 (Frieder, et al.); 2,696,959 (Aileo); 2,721,716 (Beadle); 3,173,636 (Sepp); and also United Kingdom Pat. No. 1,102,665.

In the field of lift-producing aerial devices as disclosed in more recent prior art, the overall configurations of the devices differ significantly from the earlier, vertically descending circular parachutes. Lifting or gliding devices that employ an airfoil principle undergo structural loading of a fundamentally different nature during both steady-state inflated flight and, in the case of devices intended for inflight deployment and inflation as parachutes, during the dynamic deployment sequence.

U.S. Pat. No. 3,228,635 (Hughes, et al.) discloses a gliding parachute device constituted by a single flexible surface to which a plurality of suspension lines of various lengths are attached to constrain the structure into a cambered, airfoil-like shape under load.

U.S. Pat. No. 3,285,546 and U.S. Pat. No. Re. 26,427 (Jalbert) disclose an aerial device for lifting or gliding of a load constituted by a curved upper skin with a plurality of longitudinal ribs attaching to a flat lower skin with relatively large leading edge openings in the resultant longitudinal air channels within the device, leading to relatively small openings in such channels at the trailing edge. A load is suspended from the device by a plurality of suspension lines attached to externally applied wedgeshaped members spaced apart on the lower junction of the vertical ribs and the lower skin to provide distribution of suspension pressure.

U.S. Pat. No. 3,428,277 (Everett) discloses a gliding parachute device constituted by a flexible surface to which a plurality of laterally spaced, vertically oriented vanes attach at the leading edge to assist in stabilizing the flight of the device and to define a plurality of an to maintain the desired shape of the leading edge scoops.

U.S. Pat. No. 3,524,613 (Reuter, et al.) discloses a gliding parachute device constituted by an upper and lower flexible panel to which are attached a plurality of laterally spaced, vertically oriented flexible dividers shown with openings provided near the leading edge of the device to permit air pressure equalization between channels defined by said dividers, whereupon suspension lines of uniform length concurrently attach to the device on the lower junction of said vertical dividers and the lower skin to suspend the inflated device in an arc-like shape.

U.S. Pat. No. 3,724,789 (Snyder) discloses a gliding parachute device of airfoil shape constituted by a top flexible canopy to which a plurality of ribs extending from the leading toward the trailing edge of the device attach to define airflow channels. Suspension lines are secured directly to the lower edges of said ribs by anchoring means comprised of loop extensions of a plurality of radially diverging reinforcing tapes employed as stress distributing means mounted on said ribs between the anchoring means and the top flexible canopy.

U.S. Pat. No. 3,972,495 (Jalbert) discloses a wing-like aerial device constituted of upper and lower flexible layers with a leading and trailing edge and having an inlet on a bottom or side surface for the flow of pressurized air and having a normally open flexible valve for the inlet intended to be closeable by pressurized air admitted to the wing.

U.S. Pat. No. 4,399,969 (Gargano) discloses a gliding parachute device constituted by an upper and lower skin connected by a plurality of verticaly extending airfoil-shaped ribs of specifically claimed camber characteristics spaced spanwise to define a plurality of cells comprised of a lower skin panel of generally rectangular configuration, an upper skin panel of relatively greater spanwise and chordwise extent, an adjacent pair of side ribs with a single center rib of relatively greater vertical extent having a ratio of camber height to chord between 0.1 and 0.2 between each pair of side ribs, and attached to a plurality of suspension lines so dimensioned as to impart a side to side or spanwise arc-like curvature to the inflated wing. Concurrently disclosed is an automaticaly collapsible pilot chute and bridle device, with an associated pilot chute bridle load attachment and distributing means, intended for use during deployment of the main gliding parachute.

Other disclosures in the prior art concerning pilot chute devices for parachutes and their associated bridle load attachment and distributing means may be found in U.S. Pat. Nos. 2,214,569 (Willing, et al.); 2,282,407 (Hoffman, et al.); 2,577,047 (Taylor); 2,610,008 (Smith); 3,540,684 (Snyder); and also French Pat. No. 824,349.

The fundamental difference between the structural load distributing characteristics of vertically descending, drag producing and airfoil-type lifting or gliding parachute devices are directly related to their geometric differences in construction and load attachment means. In the common embodiments of the vertically descending drag-producing devices, a single flexible surface of generally circular, rectangular, or triangular configuration is constructed of radial segments and provided with a plurality of externally applied stress distributing means spaced about and attached to the lower periphery of said surface at the radial seams, to which a plurality of suspension lines concurrently attach. These suspension lines are generally of respectively equal length, and transmit suspended load stresses in an essentially vertical and axisymmetric manner about the geometric centroid of the primary surface area to the lower periphery of the device, thence via the reinforcing means radially inward toward said centroid along the radial primary structural fabric seams within or upon which in some embodiments, the suspension lines may also be included or secured.

Embodiments representative of these construction and load attachment means are found in Commonwealth of Australia Patent Specification No. 206,084, which discloses a vertically descending parachute device of circular configuration, and in U.S. Pat. No. 1,951,865 (Driggs), which discloses a similar device of rectangular configuration.

More recently disclosed lifting or gliding aerial devices have become publicly well known, and have supplanted the earlier vertically descending, drag-producing prior art devices in nearly all applications requiring the suspension of or especially the maneuverable gliding flight of loads in the atmosphere. The aerodynamic and structural loads experienced by these lifting or gliding aerial devices are, by nature of their differing construction and modes of employment, geometrically dissimilar to the vertically descending parachute devices disclosed in the prior art. Aerial devices of similar embodiment to those described in the previously referenced disclosures and claims of Jalbert, Reuter, et al., Snyder and Gargano are of generally rectangular configuration and constituted by at least an upper flexible surface with a leading edge from which a plurality of airfoil-shaped flexible ribs depend at spanwise spaced locations and extend in a chordwise direction toward the trailing edge. A plurality of suspension lines are shown at these disclosures to be attached in chordwise spaced locations along the lower edge of each or each alternative spanwise spaced rib.

Lifting or gliding devices constituted solely by the aforementioned single flexible upper surface and plurality of ribs suffer from prohibitive performance limitations when employed in free gliding flight, due to their poor structural rigidity. Since the flexible single surface possesses no inherent rigidity, the continuous maintenance of a positive pressure gradient across the lower surface is required to prevent the oscillation or collapse of the intended smooth cambered lifting surface during flight. Since the single flexible surface will readily deflect upward or downward toward the area of lower pressure, relatively high angles of attack must be employed to ensure that the aerodynamic stagnation point remains aft of the leading edge and on or near the lower surface to dynamically pressurize said surface during flight. If this stagnation point (defined as the point at which the oncoming stream lines of air divide to pass respectively above and below the device) is allowed to occur on or near the upper surface, relatively higher dynamic pressure upon said surface would force it to deflect downward, buckling the structure and destroying the desired cambered shape. Since the surface shape is dependent upon the distribution of pressure acting upon it, and the pressure distribution is likewise dependent upon the shape of the surface, violent and potentially destructive aeroelastic oscillations would then be induced, resulting in the total loss of control of the device. Operation of the device at high angles of attack avoids this condition, but in doing so incurs a substantial penalty in aerodynamic profile and induced drag. The high drag condition at these necessarily high angles of attack discourage the employment of such a device in applications which require good glide performance, i.e., a high lift-to-drag ratio.

The operational disadvantages of these single surface devices are well known to those skilled in the art, and have relegated the employment of such devices to those applications where aerodynamic efficiency is not of critical importance, such as the stabilization of towed objects or the kiting of relatively small loads in captive flight. The aforementioned inventors appear to have recognized the relative performance advantages of pressurized dual surface airfoil-type devices in their disclosure narratives and preferred embodiments.

In the previously referenced disclosures of the more recent prior art, a commonality of ram-air pressurized device embodiments is seen. Each include a flexible upper skin and rib configurations of the single surface type devices previously described, with the addition of various embodiments of reinforcing members attaching to the lower surface of said ribs, to which the plurality of suspension lines concurrently attach, and the further addition of a lower flexible surface extending spanwise between the lower edges of said ribs and chordwise from a point offset aft of the upper surface leading edge aft to the trailing edge. This configuration provides the multicellular ram-pressurizable structure publicly recognized as the current state of the art.

Upon closer examination of the preferred embodiments of and claims concerning the reinforcing members and stress distributing means employed in these recent prior art devices, another notable commonality is seen. Embodied in each of these disclosed devices are a plurality of externally applied reinforcement members and stress distributing means not part of the primary structural surface (i.e. reinforcing tapes, lines, external fabric wedges or "flares", etc.) comprised of sustantially thicker materials than that of the primary structure that are secured to the ribs between the line attachment means and the upper surface of the device. These additional, non-primary structural reinforcing members secured to the ribs are, as disclosed by their inventors, intended to be the primary stress distributing means employed by the respective aerial devices.

In lifting or gliding aerial devices of this general configuration, as in all previous prior art in related fields, it is well known to those skilled in the art that some form of externally applied loop-like attachment member must be employed to secure a suspension line of generally tubular configuration to the generally flat surface of the primary structure. Secondarily, the dissimilarity of relative tensile strengths and elasticities between the thinner and more elastic primary structural material and the thicker and less elastic suspension line material usually necessitates the use of a local reinforcement means at the line attach points, whereupon the secured line attachment may be incidentally employed as a reinforcement. A clear distinction, however, should be made between the function of such a local reinforcement means at a suspension line attach point and the function of the stress distributing means, which are employed to distribute the applied load from the suspension lines throughout the primary structure of the device as a whole.

The aforementioned dissimilarities in tensile strength and elasticity between the thin, low porosity flexible materials commonly used in the primary structure and the relatively thicker, externally applied reinforcing members and stress distributing means are critically important considerations in the selection of such materials during the structural design of lift-producing aerial devices, especially in view of the multiaxial and nonaxisymmetric loading experienced by such devices during deployment and gliding flight.

U.S. Pat. No. 2,500,170 (Fogal) discloses a circular parachute device of the vertically descending, drag-producing type. The configuration of this device, in one preferred embodiment, is constituted entirely of ribbons comprising the stress distributing means directly from the load attachment means radially inward to the apex. This configuration avoids the aforementioned dissimilarity in material characteristics between a thin primary structure and relatively thicker and less elastic reinforcing members and stress distributing means by completely eliminating the thin primary fabric in favor of ribbon material more structurally compatible with the suspension line material. This principle is in direct contrast to the object of the invention disclosed herein, which is to eliminate, to the greatest practical extent, the thicker materials of poor structural compatibility with the thin primary structure in favor of the more efficient use of said thin primary structural material.

The disclosures concerning the load attachment and stress distributing means of the lift-producing aerial devices of the recent prior art may be examined as to their relative employment of thin primary structural members or relatively thicker externally applied reinforcing members in their respective stress distributing means.

Specifically, U.S. Pat. No. 3,285,546 and U.S. Pat. No. Re. 26,427, and U.S. Pat. No. 3,972,495 (Jalbert), all show an improvement of the previously disclosed wedge-shaped load attachment and distributing means in the embodiment of combined rib and connector pieces of generally triangular or wedge-shaped configuration.

U.S. Pat. No. 3,724,789 (Snyder), as previously referenced, discloses various embodiments of aerial devices that employ a plurality of radially diverging reinforcing tapes secured to the airfoil-shaped ribs at each of the plurality of suspension line attach points.

U.S. Pat. No. 4,399,969 (Gargano), as previously referenced, discloses specific geometric configurational improvements to a ram-pressurized gliding parachute of otherwise conventional construction, the innovative features of which being two specific airfoil profiles, single ribs of relatively greater camber height than and spaced between adjacent suspension load bearing ribs and, most notably, an automatically collapsible pilot chute and bridle device with an associated bridle load attachment means. The invention embodies a suspension line attachment and stress distributing means substantially similar to that taught by Snyder, in that the plurality of suspension lines are attached to loop extension of vertically extending reinforcing tapes stitched to the ribs, which are illustrated to fully extend from the line anchoring means directly to spaced locations on the top flexible skin. The inventor specifically illustrates as the preferred embodiment a construction including reinforcing tape, loop extensions, seam reinforcing strips, and seam end reinforcements.

The aforementioned commonalities in both the general configurations and the line attachment and stress distributing means employed in devices representative of the recent prior art should be readily apparent. Veritably all of the lifting and gliding aerial devices, and most especially the gliding parachutes, of recent manufacture and in current use both in the United States and abroad, are of similar and well known overall configuration and embody line attachment and stress distributing means as taught by either Jalbert or Snyder.

The present invention employs line attachment and stress distributing means derived from structural principles fundamentally different from and unanticipated by those of the prior art. The invention also contemplates various embodiments of new and improved aerodynamic pressurization control, suspension system design, and flight control principles heretofore undisclosed in prior art.

In the conventionally configured airfoil-shaped, ram-pressurizable gliding device, the inflated "wing" is, as discussed by Jalbert, suspended at an angle of incidence downward, so that the leading edge will be relatively below the trailing edge during normal gliding flight. A plurality of line attachment points connected to chordwise spaced locations on the lower edges of the various ribs are provided in spanwise extending rows on or near the lower surface beginning at the leading edge. The suspension lines attached thereto are commonly dimensioned so that the lines of each spanwise row are of respectively equal lengths from said attach points to the load and that their relative lengths increase from row to row aft from the leading edge toward the trailing edge. In the typical gliding device, four such spanwise rows are employed as primary suspension lines (normally designated "A" through "D" from the leading toward the trailing edge), with a fifth row of differing geometry employed both as suspension and control lines and attaching along the trailing edge.

It is obvious to those skilled in the art to join lines depending from each of the ribs to which suspension lines attach (commonly known as "load bearing" ribs) so that each respective leading edge "A" line joins in a chordwise manner with the "B" line directly aft of it, serving to combine two adjacent spanwise rows of lines from the lower surface of the canopy into one spanwise row extending downward in left and right groups to the forwardmost of respective pairs of front and rear risers attached to the load, for the purpose of reducing the amount of suspension line required and thereby reducing the attendant weight, bulk, and cost. The procedure is typically repeated for the "C" and "D" lines leading to the remaining left and right rearmost risers. This procedure, commonly known as "cascading", is well known and has been in public use for well over a decade.

The geometry of structural load transmission to the line attachment means can now be seen to be quite complex, especially in comparison to the relatively simple vertical and axisymmetric peripheral loading experienced by the earlier circular parachutes. The gliding device employing a cascaded suspension line system must distribute tensile loads applied to its line attachment means in various orientation, depending upon the particular geometry of the cascaded lines. These loads tend to transmit through the flexible structure linearly, along the projected axis of attachment to the line attachment means.

The great majority of aerial devices of both the drag-producing and lift-producing types manufactured during the last fifteen years have been fabricated primarily of various forms of thin, low porosity fabrics composed of high tenacity synthetic yards woven into very closely spaced rectangular patterns, providing excellent tensile strength and resistance to rip propagation. The structural designs of devices in current use, however, still closely resemble those of much earlier devices dependent upon much inferior materials and weaves now considered obsolete by those skilled in the art, such as silk and pongee of twill-type and taffeta-type weaves. These obsolescent materials had relatively poor tensile strength and especially poor resistance to rip propagation due to their low elasticities and relatively brittle fibers and required extensive reinforcement to withstand applied loads. These characteristics were well known to those skilled in the early art, and are reflected in the pervasive use of radially oriented reinforcing tapes and multiple overlapping layers of primary fabric in likewise reinforced seams at the line attach points of these prior art devices. The currently employed line attachment and stress distributing means of Jalbert and Snyder, although applied to the more recent lift-producing types of devices, are strongly reminiscent of the earlier, heavily reinforced prior art in their common employment of externally applied reinforcing members radially diverging from the line attachment means. Similarly, the previously referenced improvement by Gargano comprises a simplified embodiment of the same principle as that taught by Snyder.

The aforementioned recent improvements in primary structural fabrics provide relatively higher tensile strengths than materials commonly used in the prior art. Substitutions of such material into the earlier gliding devices appeared very attractive, allowing the production of significantly lighter and less bulky products than previously possible, without the apparent need for potentially expensive re-engineering and modification of configuration or construction methods. However, in the original design of the earlier prior art devices, the differences in the relative elasticities between the primary structural fabric and the attached reinforcing member were manageably small. With the incorporation of the newer, thinner fabrics of relatively higher elasticities into devices employing substantially unchanged reinforcing members and stress distributing means based upon older prior art, however, these relative elasticity differences have increased dramatically, to the point of creating structural failure modes unanticipated in the prior art. These unrecognized relative elasticity problems have plagued the parachute manufacturing industry for nearly a decade in the form of poor product durability and reliability, and have indirectly served to inhibit further innovation, especially in efforts to further reduce weight and bulk. Closer analysis of structural material characteristics and experimentation with novel and improved aerodynamic configurations have resulted in the discovery of new structural and aerodynamic principles which are disclosed herein.

The aforementioned thinner, improved fabrics derive their advantages from their ability to elastically deform under relatively high applied tensile loads without ruputuring their constituent fibers and to return their normal shapes upon removal of said applied loads. The closely spaced rectangular network of very thin fibers provides a unique structure wherein it allows incrementally very small amounts of interstitial slip between adjacent rows of fibers to occur, thereby requiring each fiber to elastically deform by only a similarly small amount to accomodate a load, yet it allows relatively large elastic deformation of the fabric surface as a whole due to the very large density of fibers per unit area of fabric. For these advantages to be realized, however, the surfaces of fabric employed in the loaded structure must remain free to so elastically deform during the accomodation of said loads, especially if such loads are rapidly applied or of a continuously variable nature.

The penalties suffered for constraining such fabrics to rigidly limited shapes have not been anticipated in the prior art. The application of a relatively inelastic "reinforcing" member to the surface of such fabrics prohibits the said incrementally small interstitial slip from naturally distributing through the fabric network to which the externally applied member is secured. This penalty is further compounded by the stitching used to secure the member to the fabric, in that the perforations caused thereby sever the fibers comprising the fabric network and introduce numerous point loads and resulting stress concentrations applied at the damaged sites by the threads comprising the securing means.

Since the rectilinear fiber configuration of the fabric network allows relatively greater overall surface elastic deformation in response to loads applied in a diagonal or "bias" direction than those applied in an "axial" direction, i.e. parallel to either axis of fibers, bias oriented point loads impose an even greater penalty by simultaneously introducing stress concentrations and disrupting the proportionally larger elastic deformations oriented in the structurally weaker bias direction. It is unfortunately in this bias direction that the "reinforcing" members and "stress distributing" means secured to the ribs as taught in the prior art are employed.

This analysis of the structural characteristics of materials in present use in the art has conclusively shown the claims concerning the intended functions of "reinforcing" members and "stress distributing" means as disclosed in the prior art to be technically flawed and inappropriate when applied to embodiments incorporating the said present materials. Indeed, the employment of these members and means taught in the prior art in combination with said present materials has been discovered by the present inventors to degrade rather than reinforce the integrity of the primary structural fabric, and to concentrate rather than distribute applied loads.

Testing of experimental devices employing this structural principle unexpectedly revealed a related aerodynamic principle that provides significantly improved flight performance and ease of maneuvering flight control as compared to devices disclosed in the prior art. It is well known in the field of aerodynamics that the lift and drag characteristics of an airfoil in low-speed flight are primarily dependent upon its shape, angle of attack, and the flow condition of the associated upper surface boundary layer. These three performance considerations are relatively easily controllable in aircraft, wherein the optimum aerodynamic shapes for various flight conditions are determined and a rigid structure is designed employing various similarly rigid lift and drag devices and flight control surfaces of variable geometry to control the shape of the aircraft in flight. In the flexible, ram-pressurized structure of the lifting devices under discussion, however, the pressurized aerodynamic shape is not maintained by such rigid structures and is therefore totally dependent upon and variable with the applied aerodynamic and structural loads. Accordingly, these loads must necessarily be known and anticipated in order to predict and control the aerodynamic performance of the device and to properly design the shapes and relative orientations of the flexible structural components comprising the device so that a predetermined pressurized shape optimized for a desired flight condition is provided.

The aforementioned present aerial devices embodying reinforcing and suspended load stress distributing means as taught by Jalbert, Snyder, and Gargano similarly concentrate said stresses along their respective reinforcing means secured to the vertically oriented ribs and thereby defeat the inherent load distributing capability of the relatively more elastic material comprising their primary structures. These stress concentrations distort the intended airfoil shape of the ribs during flight and produce spanwise rows of relatively large concave depressions in the upper surface of the pressurized structure located at each of the junctions of said stress distributing means and the upper surface. These pronounced irregularities in the upper surface comprise two significant aerodynamic disadvantages, in that they simultaneously destroy the intended cambered airfoil shape of and cause turbulent boundary layer separation and premature flow detachment across the upper surface, thereby reducing the lift and increasing the drag produced by the device in flight.

In addition to these stress concentration induced depressions, equally significant irregularities in the upper surfaces of the devices of the prior art are produced by the vertical displacement of the upper surface at the "non-load bearing" ribs or dividers located between the "load bearing" ribs whereupon the suspension lines are attached. Due to the negative pressure gradient across the upper surface, i.e. a relatively lower pressure above than below said surface, the surface naturally tends to distend upward between said "load bearing" ribs.

This vertical displacement or "bow height" comprised by said distension of the upper surface is due to the typical employment of "non-load bearing" ribs of equal camber height to those of the respectively adjacent "load bearing" ribs that define each "cell", commonly selected for the convenience that such uniformity provides during manufacture, whereby the central "non-load bearing" rib actually does transmit the pressure gradient induced load between the upper and lower surfaces to which it attaches, thereby vertically retracting and displacing the lower surface upward by an amount equal to that of the upper surface. This "bow height" is so produced in commeasurably increasing proportion to both the spanwise separation of the respectively adjacent pair of ribs and to the local magnitude of the pressure gradient, and is typically on the order of one-third to one-half of the maximum camber height of the selected rib. Of notable exception to this common practice is the embodiment disclosed in U.S. Pat. No. 4,399,969 (Gargano), wherein the inventor claims a central "non-load bearing" rib of a camber height in the range of ten to twenty percent of chord length and specifically of relatively greater camber height than that of the respectively adjacent "load bearing" ribs.

The disadvantages inherent in the prior art devices embodying these substantial amount of airfoil "bow height" are numerous. Since the vertically displaced areas comprise upper surface irregularities and are produced by the same pressure gradients responsible for the production of lift, the aforementioned turbulent boundary layer transition and separation disadvantages that they impose are suffered across the specific areas of the upper surface where degraded lifting efficiency can be afforded the least. The associated drag penalty is compounded by the increased profile drag incurred by the relatively increased effective airfoil thickness due to the displaced upper surface. Thirdly, since the spanwise component of the curvilinear spanwise distance across the vertically bowed segments of upper surface comprising each pressurized cell necessarily decreases with increasing bow height, the spacing between the upper edges of the pair of adjacent "load bearing" ribs defining said cells is constrained to decrease in flight in proportion to increasing bow height. This geometric relationship reduces the effective span of the device and results in a pressurized planform area significantly smaller than that of the material from which it is constructed, meaning that a similarly significant percentage of said material actually provides no lifting area in flight, the excess area instead being used to comprise the aerodynamically counterproductive bow height.

These disadvantages prevalent in the devices of the prior art are eliminated in the present invention by the employment of both the aforementioned structural load distributing principle, which eliminates the said stress concentration induced depressions on the upper surface, and of a novel aerodynamic principle wherein dividers of relatively lesser camber heights and chord lengths than that of the adjacent ribs are employed and dimensioned so that during pressurization the upper surface of the device attached to the respective upper edges of said dividers shall be constrained in such a manner as to locate themselves at a height equal to the camber height of the respectively adjacent ribs, thereby greatly reducing bow height and providing a substantially smoother and more aerodynamically efficient upper surface.

As previously discussed, the flexible structures of these devices have no inherent structural rigidity, and rely upon ram pressurization contained within the cells to provide the rigidity required to maintain their intended pressurized shapes in flight. However, since the manuevering flight control of these devices is effected by the intentional warping or bending of their entire pressurized structures, structural designs that maintain the uniformly high internal pressurizations required to provide the desirable rigidity in flight require relatively high control actuation forces to overcome this rigidity and to warp or bend the structure into the shape required to effect the desired flight maneuvers. The present invention provides a means of automatically controlling the internal pressurization whereby the internal ribs and dividers respectively terminate at locations forward of the trailing edge of the device.

This configuration allows substantial internal spanwise air flow near the trailing edge of the device, whereupon trailing edge control lines comprising one mode of flight control means are normally provided at spaced spanwise intervals so as to retract said trailing edge downward to thereby warp the structure into the shape required to effect a desired flight maneuver. In this mode of flight control, the camber and angle of attack of the respective left or right sides of the airfoil-like device are increased, thereby producing a braking effect by momentarily increasing the lift and greatly increasing the drag produced by the respective side of the device. The internal spanwise air flow provided by the invention is desirable in that it provides an automatic means of depressurizing the warped structure near the trailing edge during said control actuation, thereby decreasing its rigidity and substantially reducing the required actuation force, while also substantially improving the speed and uniformity of pressurization of said trailing edge, thereby providing improved deployment performance and reliability.

This aerodynamic principle also provides a dramatic improvement in a second, less commonly employed mode of flight control, wherein the airfoil comprising the said respective sides of the device is retracted downward at its leading edge, thereby reducing the angle of attack and the resultant lift of the respective leading edge. This control mode is useful in reducing tow forces require during the launch and lifting of captive loads and especially useful in sport parachute applications such as "canopy relative work", wherein the objective of inflight pursuit of and subsequent formation flight with other gliding parachutes requires the increased vertical speed and maneuverability provided by this means. These increased flight speeds, however, significantly increase ram pressurization of the structure, and thereby increase actuation forces required to retract the leading edge. In the devices of the prior art, the suspension lines usable for leading edge control are, as previously discussed, concurrently secured to the front riser-like load attachment means with the suspension lines depending from the adjacently aft spanwise row of line attachment means near the lower surface. Since these forwardmost two spanwise rows of suspension lines attach in the chordwise region where the upper surface negative pressure gradient associated with the production of lift is greatest, the relatively large forces are required to retract the leading edge so attached. These required actuation forces become extremely large as the structure becomes more rigidized with increasing airspeed, which commonly depletes the physical endurance of parachutists attempting many such maneuvers during extended canopy relative work flights.

In contrast, the invention embodies a single spanwise row of suspension lines comprising leading edge camber control means which depend in respective left and right groups of equal number and without chordwise "cascading" from the line attachment means near the lower surface to the forwardmost pair of riser-like load attachment means to which the leading edge lines exclusively attach. In addition, the invention contemplates the embodiment of dividers which terminate at chordwise locations well forward of the trailing edge so that the pressurized device is provided with a spanwise axis described by the respective junctions of the lower aft edges of said dividers and the lower surface. This axis can be considered as dividing the device into two structurally different chordwise regions, the forward region being comprised of cambered ribs and dividers providing upper surface attachment means of relatively close spanwise spacing and of a relatively rigid structure, and the aft region wherein only the ribs extend to provide upper surface attachment means of considerably wider spanwise and of therefore less rigid structure. In the embodiments of devices intended for use in applications wherein this leading edge control means is desirable, the invention contemplates the location of said axis near the spanwise row of line attachment means adjacently aft of the leading edge, i.e. the aforementioned "B" lines, so that said axis describes a hinge-like line upon which the more rigid structure of the forward region may more readily bend downward in relation to the more flexible structure aft of the axis. The leading edge camber control line and partial chord length divider configurations disclosed herein, whether embodied separately or in combination, eliminate the relatively higher control actuation forces required by the devices of the prior art and provide dramatically improved maneuverability and ease of flight control.

SUMMARY OF THE INVENTION

The present invention contemplates the employment of the novel structural principle disclosed herein in various embodiments of flexible aerial devices wherein no externally applied reinforcing members comprising stress distributing means whatsoever are secured to the ribs. This configuration has heretofore been believed by those skilled in the art to be unachieveable in view of the poor structural integrity suffered by the aforementioned recent embodiments wherein unsuccessful attempts were made to substitute said thinner, improved materials while retaining various forms of reinforcing means employed by the prior art devices of older design.

The invention concurrently contemplates the employment of said principle in a preferred embodiment of suspension line attachment means incorporated in the various embodiments of flexible aerial devices.

The present invention also contemplates various embodiments of flexible aerial devices wherein the inflated shape of the upper surface is constrained by a plurality of generally vertically oriented airfoil-shaped dividers, ribs and associated suspension lines so dimensioned as to provide improved aerodynamic efficiency and ease of maneuvering control during flight.

The invention further contemplates a preferred embodiment of load suspending means wherein various embodiments of flexible aerial devices are provided with maneuvering flight control means of improved construction whereby direct manual or servomechanical airfoil camber and pitch attitude control may be effected by relatively small control actuation forces, thereby substantially increasing launch efficiency and reducing tether forces in captive flight applications while dramatically improving maneuverability and glide performance in free flight.

The various embodiments of the present invention, whether employed separately or in combination, are contemplated to provide aerial devices of increased structural integrity and load suspending capability, increased reliability, lighter weight, and reduced bulk as compared to the devices of the prior art, of simultaneously improved aerodynamic performance and ease of control and at a relatively lower cost of manufacture.

BRIEF DESCRIPTION OF THE DRAWINGS

FIG. 6 is a front view of a spanwise cross-section of the aerial device showing the configuration of a typical cell of one divider.

FIGS. 6B and 6C are front views of an aerial device showing the configurations of a typical cell with one divider which are typical of the prior art.

FIG. 7 is a front view of a spanwise cross-section of the aerial device showing the configuration of a typical cell of two dividers.

FIG. 8 is a front view of a spanwise cross-section of the aerial device showing the configuration of a typical cell of three dividers.

FIG. 10 is a perspective view showing the internal arrangement of one embodiment of the deployment device load attachment means.

FIG. 11 is a perspective view showing a second embodiment of the deployment device load attachment means.

FIG. 12 is a perspective view showing a third embodiment of the deployment device load attachment means.

FIG. 13 is a cutaway end view showing the typical chordwise location of the deployment device load attachment means as shown in FIG. 10 with respect to the suspension line attachment means in one embodiment.

FIG. 14 is a side detail view showing the construction of the deployment device load attachment means shown in FIG. 10 and FIG. 13.

DETAILED DESCRIPTION OF THE PREFERRED EMBODIMENT

Figure 1:
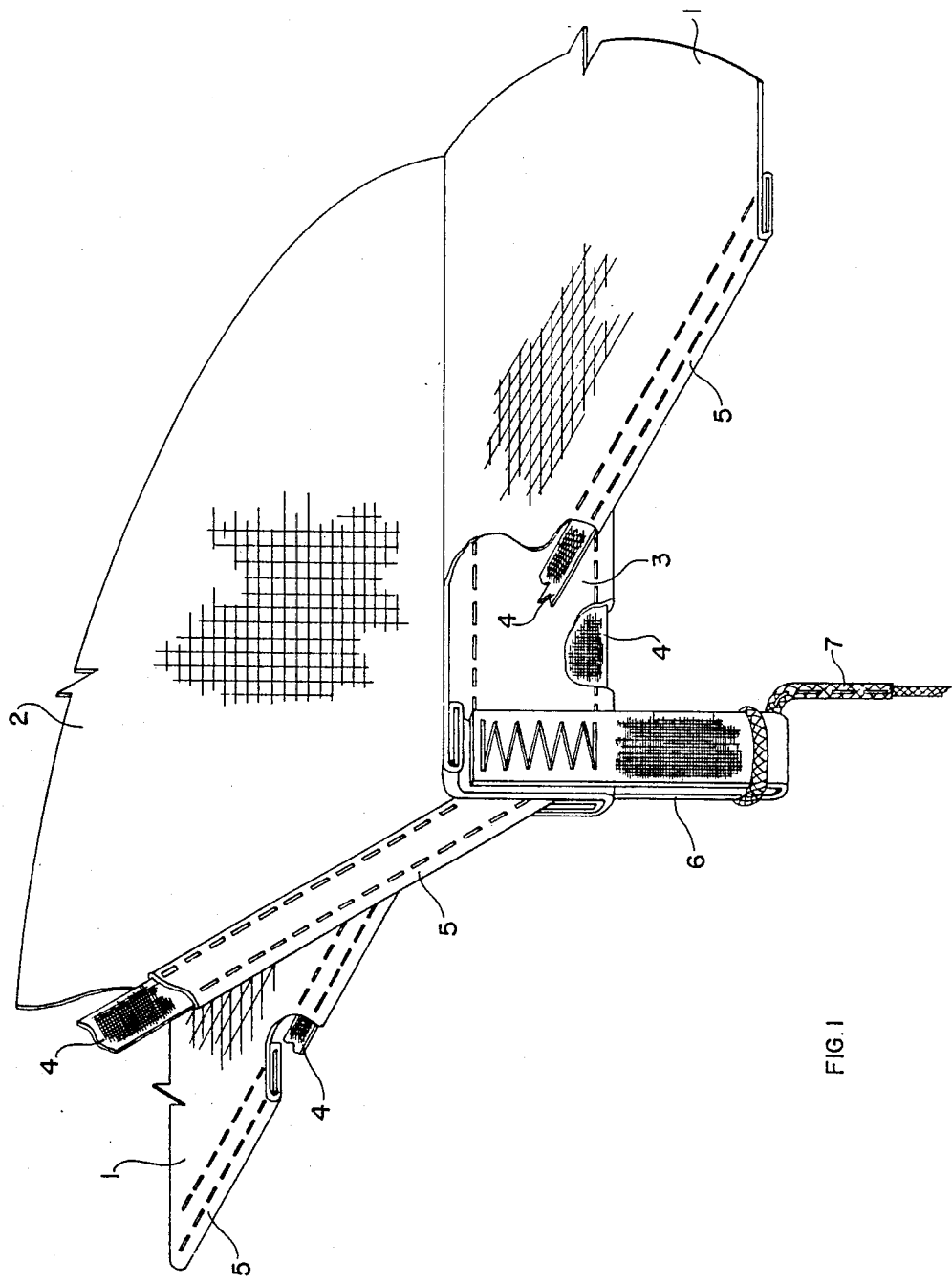
FIG. 1 shows a partial perspective view of an aerial device structure showing the typical construction of a lower surface securing means at the leading edge.
Figure 2:
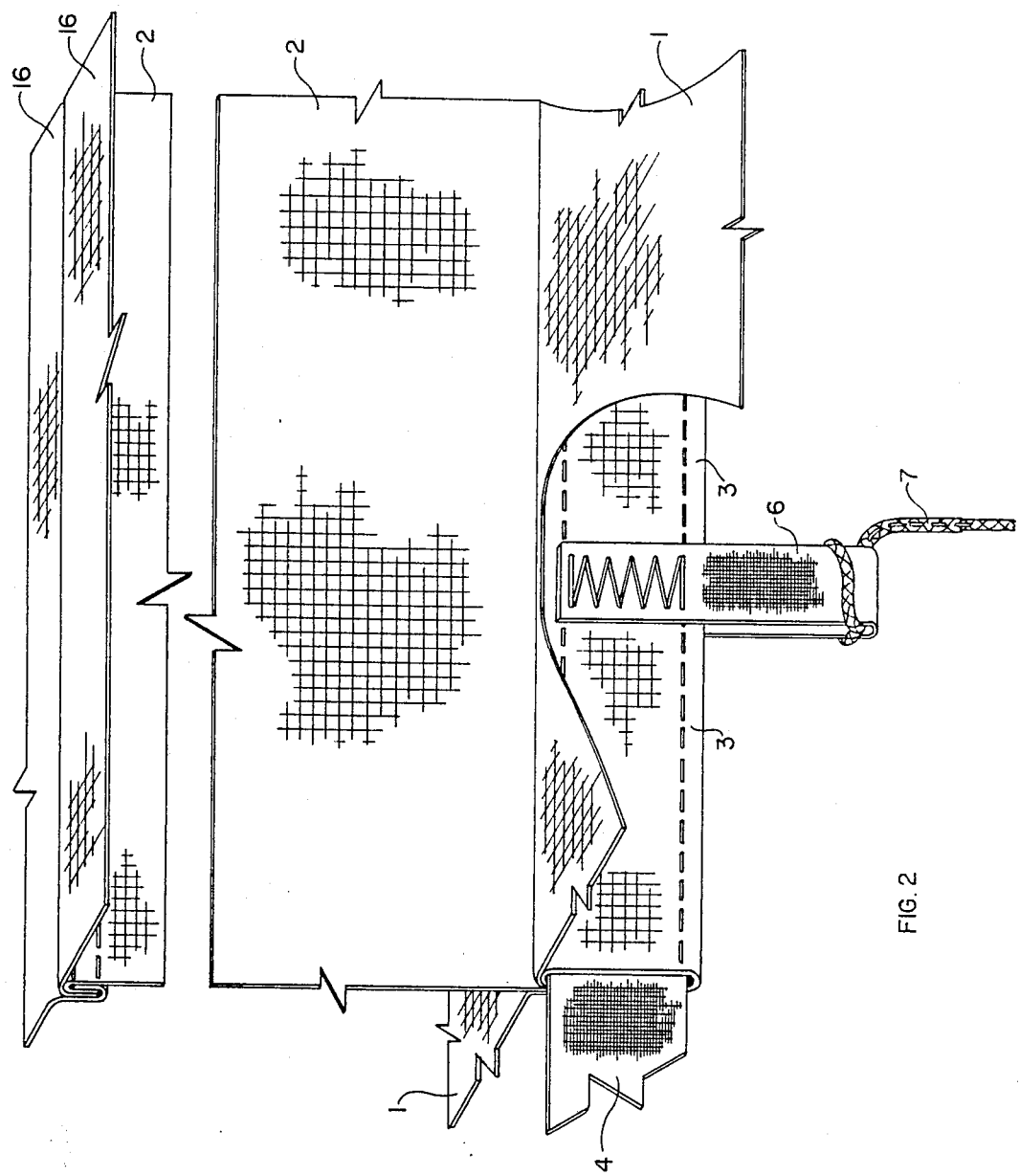
FIG. 2 is a partial perspective view of a typical suspension line attachment to the lower surface securing means aft of the leading edge.

Referring now to the drawings, wherein like numerals designate corresponding parts throughout the several figures, and specifically to FIGS. 1 and 2, there is shown a construction in accordance with a preferred embodiment of the invention as it is employed in the lifting aerial device. FIG. 1 shows a typical junction at the leading edge of the lower surface 1 and a vertically oriented rib 2 wherein the spanwise edges of adjacent segments of the lower surface 1 are folded and mutually interlocked to form the vertically oriented lower surface securing means 3. An optional thin reinforcing ribbon 4 comprised of material of similar elasticity to that of the primary structural components and of any selected length may be included into the chordwise folds of securing means 3 as desired. The respective leading edges 5 of lower surface segments 1 and of the airfoil-shaped rib 2 are repeatedly folded and secured so as to prevent the fraying of the cut edge, and may also include segments of thin reinforcing ribbon 4 concurrently secured therein as desired. The lower edge of rib 2 is inserted into the vertically oriented slot formed in securing means 3 and said means is closed and secured by chordwise lines of stitching. An externally applied line attachment loop 6 comprised of relatively thicker material is placed at the leading edge of the lower surface securing means 3 in an appropriately oriented manner and secured to the securing means by any of various suitable stitching means, such as bar-tacking, zig-zagging, or multi-stitching. It should be noted that the suspension line attachment loop 6 vertically extends from the lower edge of the securing means 3 by a distance not less than its respective width, and is stitched vertically so that variations in load will be absorbed by the loop 6 and not twist or pucker the material of securing means 3 at the point of attachment. It should also be noted that this method of line attachment provides a substantial reduction in bulk as compared to the direct attachment methods as taught by Snyder and Gargano, wherein multiple overlapping reinforcement members create a thick confluence of material through which repeated stitching perforates the primary structural fabric, thereby actually weakening the junction. A suspension line 7 is then secured by appropriate means to the lower end of loop 6, or said loop may be eliminated and the suspension line 7 may be secured directly to the securing means 3 by stitching as the application may require.

Referring to FIG. 2, a similar process is employed wherein a suspension line attachment loop 6 is located in an appropriate orientation and chordwise position along securing means 3 and secured by stitching. It should be noted that this method provides great flexibility and cost savings during manufacture by allowing the employment of a standard manufacturing method wherein the construction of the lower surface securing means 3 of widely various models and configurations of devices remains relatively identical, differing only by the locations along the said securing means upon which the respective line attachment loops 6 are secured. This construction is also advantageous when modifications or repairs of assembled devices are necessary, since the externally applied loops maybe easily removed and replaced at different locations without being constrained to the fixed positions defined by the internal stress distributing means employed in devices of the prior art.

Figure 3:
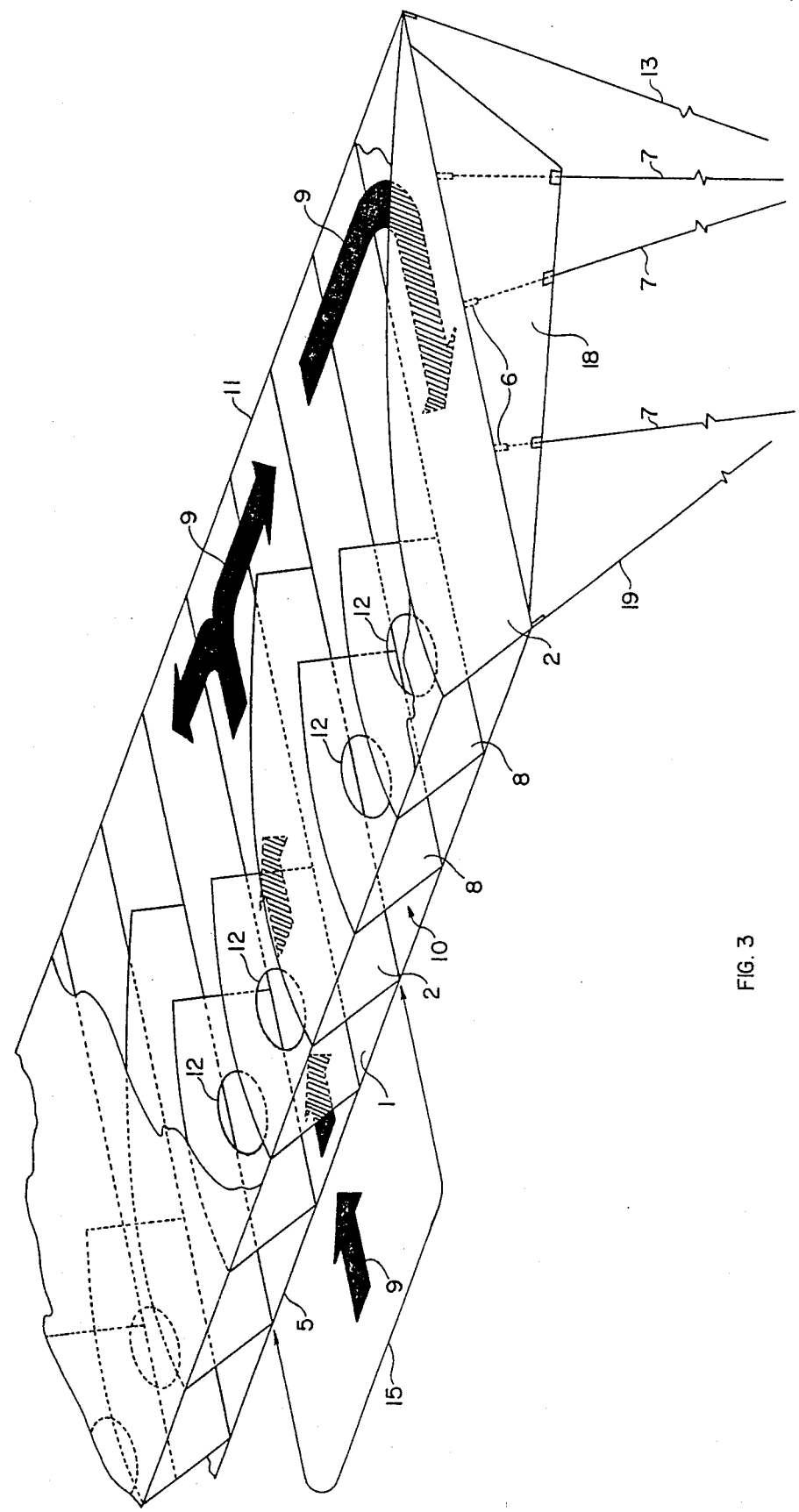
FIG. 3 is a perspective view of an aerial device with the upper surface removed for clarity, showing the internal arrangement of ribs and dividers of one embodiment.

In FIG. 3, the internal arrangement of one embodiment of the device, with the upper surface removed for clarity, wherein the arrangement of the lower surface 1 with a leading edge 5 and a trailing edge 11, one of a pair of stabilizers 18, the location of a typical suspension line attachment means 6 with an attached suspension line 7, trailing edge control lines 13, the relative chordwise extents airfoil-shaped ribs 2 and dividers 8 having cross ports 12 and forming a plurality of cells 15 with leading edge air inlets 10 extending spanwise across the device is shown. Also shown is a simplified diagram of the incoming flow through the leading edge inlets 10 of pressurizing air 9 as it proceeds aft toward the trailing edge 11 and then spanwise through the gap between the aftmost ends of the ribs 2 and the dividers 8 and the trailing edge 11 to thereby provide improved inflation and internal pressurization characteristics, especially during the inflight deployment of such devices employed as parachutes.

Figure 4:
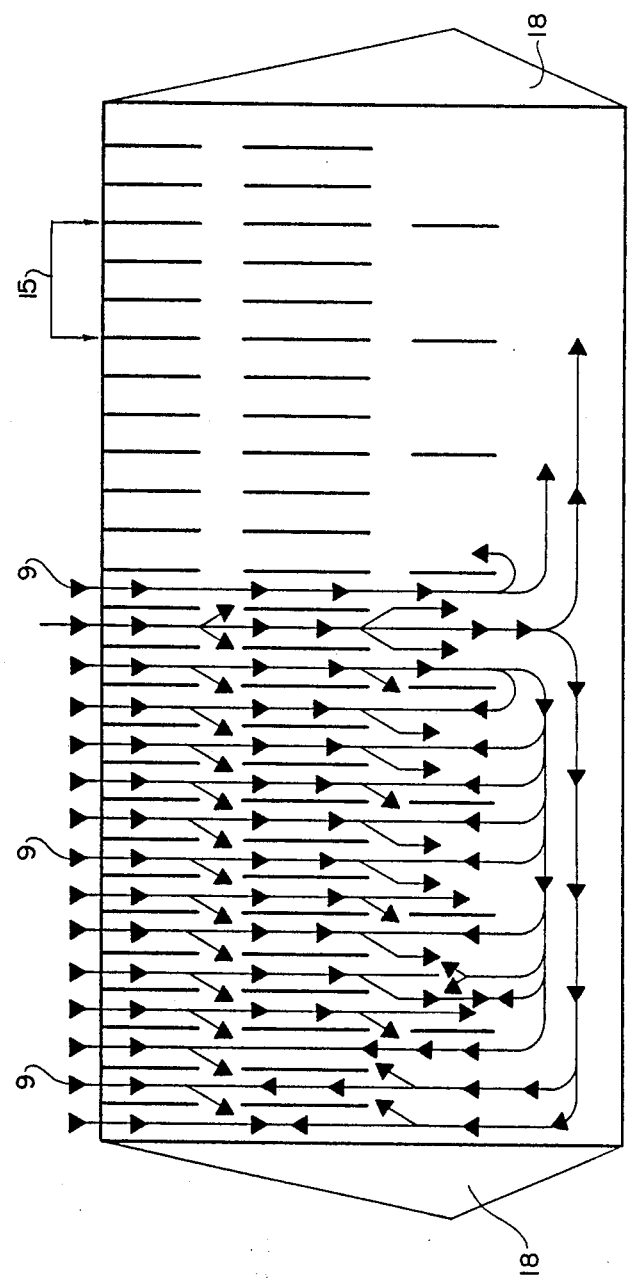
FIG. 4 is a top view of an aerial device with the upper surface removed for clarity showing the typical internal air flow during inflation of one embodiment.

As can be seen in FIG. 4, a top plan view is shown detailing the internal air flow described in FIG. 3, wherein the flow of pressurizing air 9 enters the leading edge inlets 10 of the cells 15 and freely moves spanwise through cross ports 12 provided in some of the ribs 2 and dividers 8 and through the gap between the aftmost ends of said ribs and dividers and the trailing edge 11, thereby pressurizing the structure of the device in flight.

Figure 5:
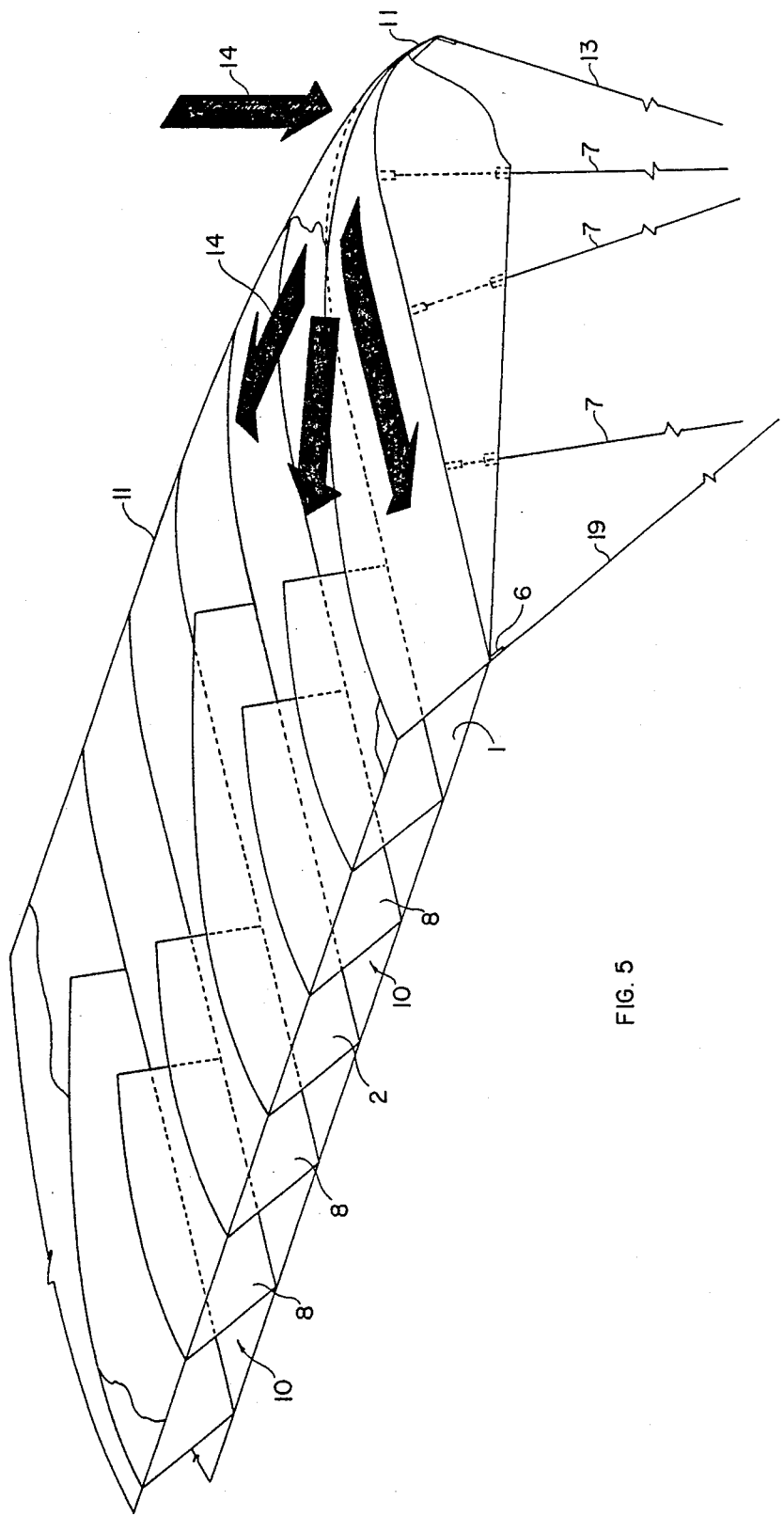
FIG. 5 is a perspective view, with the upper surface removed for clarity, showing the typical depressurization of the trailing edge during deflection for flight control purposes.

In the perspective view of FIG. 5 showing the upper surface of the aerial device removed for clarity, the trailing edge control lines 13 are shown retracting the trailing edge 11 downward to effect maneuvering flight control. A simplified diagram of the internal airflow 14 is provided to depict the function of the forwardly terminated ribs 2 and relatively more forwardly terminated dividers 8 during such control actuation. The momentary increase in internal pressurization that occurs as the trailing edge 11 begins to retract downward is immediately relieved by exhausting through the aforementioned gaps between the ribs and dividers, and the trailing edge, providing a spanwise flow inward and allowing the deflected trailing edge structure to depressurize, thereby reducing the structural rigidity of the deflected area and concurrently reducing the required control actuation forces. An additional advantage is gained by the arrangement of the dividers 8 that terminate well forward of the deflected area, allowing said deflected area near the trailing edge 11 to remain relatively flexible while the said dividers rigidize only the forward portion of the structure. This embodiment allows the maintenance of a relatively rigid pressurized forward lifting structure while further reducing the rigidity and associated control actuation force requirements, thereby further improving the ease of maneuvering flight control.

Referring now to FIGS. 6 through 8, three different embodiments of the invention are illustrated by respective front views of spanwise cross-sections of individual cells 15 defined by an adjacent pair of ribs 2 of a selected camber height which respectively attach at their upper edges to the upper surface segment 16 and at their lower edges to the lower surface segment 1, and having various arrangements of dividers 8 of relatively lesser camber height than the respectively adjacent ribs. Referring to FIG. 6, an embodiment of the invention employing one divider 8 is shown wherein said divider attaches by its upper edge to the upper surface 16 and by its lower edge to the lower surface 1 and is of a said lesser camber height than that of the adjacent ribs so as to constrain the upper surface to which it is attached to locate itself at a camber height equal to that of the said adjacent ribs 2 during pressurization in flight.

Also illustrated in FIG. 6 is an amount of bow height 17 that occurs in the pressurized cell 15 during flight. The said bow height that occurs in this embodiment of the invention may be compared to those shown in FIG. 6B, which is illustrative of the prior art as taught by Jalbert and Snyder, and in FIG. 6C, which is illustrative of the prior art as taught by Gargano. It is readily apparent from the drawings that the invention provides significantly reduced upper surface distension and resultant effective airfoil thickness in comparison to those of the prior art devices.

Similar comparisons may be drawn by reference to FIGS. 7 and 8, wherein cells 15 are shown to be defined by respective adjacent pairs of ribs 2 shown to be of equal camber heights in each of the FIGS. 6, 7, and 8 and which likewise attach at their respective lower and upper edges to the lower surface segment 1 and the upper surface segment 16, with multiple dividers attached to the insides of the lower and upper surfaces therebetween. In the embodiment shown in FIG. 7, the two dividers 8 are of relatively equal camber height, both being of lesser camber height than the adjacent ribs. This arrangement is shown to provide a relatively insignificant bow height 17 and a very smooth upper surface 16, in even more obvious contrast to those of devices of the prior art.

FIG. 8 depicts an embodiment of employing three dividers 8 wherein the centermost of said dividers is of the relatively least camber height, with the two adjacent dividers of respectively equal camber heights that are greater than that of the central divider but less than the adjacent ribs 2. The remaining details of arrangement and advantages are otherwise similar to those shown in FIGS. 6 and 7.

Figure 9B:
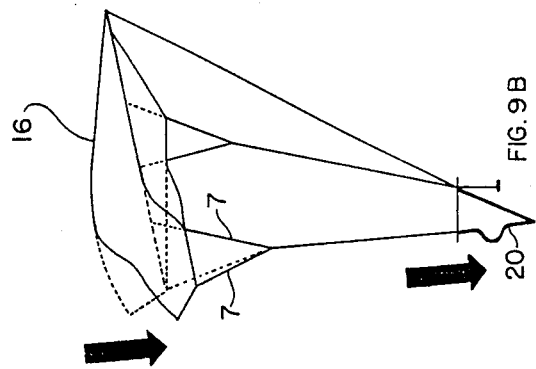
FIG. 9B is similar to that of FIG. 9 showing, however, typically what happens in prior art devices when forward risers are retracted thereby destroying the convexly curved airfoil shape.
Figure 9:
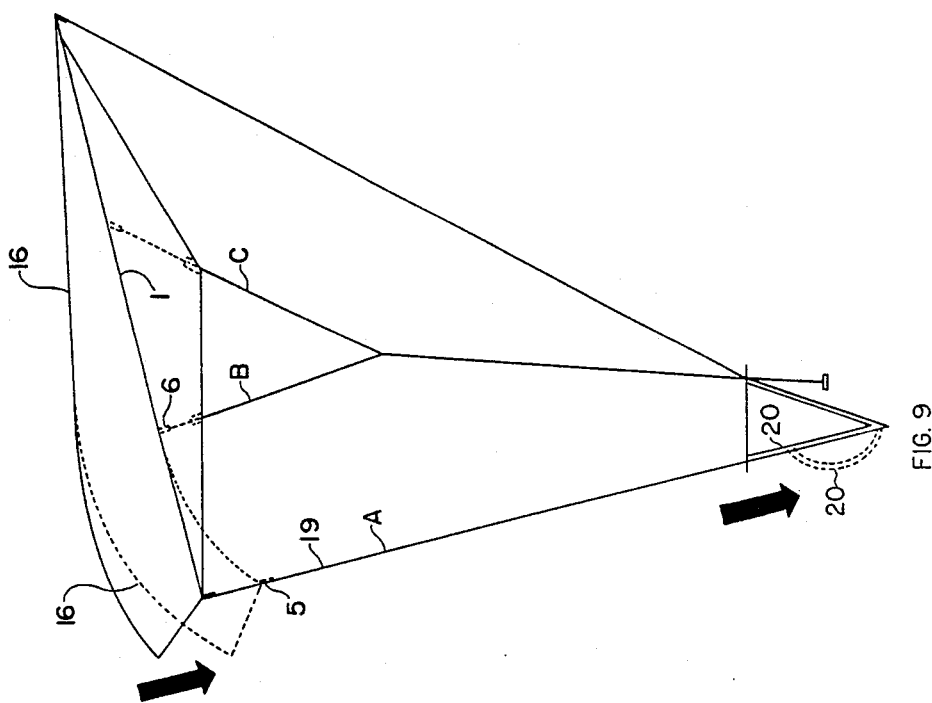
FIG. 9 is an end view of one embodiment of the invention showing the retraction of the leading edge during flight by the leading edge camber control means.

Referring to FIG. 9, an end view of a preferred embodiment of the invention depicts the arrangement of the suspension lines 7 and the function of the leading edge camber control means comprised by the fowardmost leading edge control lines 19 during maneuvering flight. The downward retraction of one or both of the forwardmost riser-like load attachment means 20 is shown to likewise downwardly retract the leading edge 5 to which the said groups of control lines 19 are attached, causing a substantial effective decrease in angle of attack of the respective leading edge portion of the airfoil section to which the actuated said control line group 19 is attached. During such control actuation, the camber of the upper surface 16 is somewhat increased and the airfoil-like convexly curved shape and surface smoothness thereof are substantially preserved. The leading edge portion of the airfoil section is further shown to hinge or pivot about a chordwise point aft of the leading edge 5 along the lower surface 1 located near the chordwise point whereupon the spanwise row of suspension line attachment means 6 adjacently aft of the leading edge 5 is secured, so that the suspension lines 7 aft of the leading edge control lines 19 are not concurrently retracted. This arrangement provides for the maintenance of an aerodynamically efficient airfoil shape during maneuvering flight, thereby retaining good lifting performance and relatively low drag. This configuration embodied herein provides a novel flight control means wherein the aerodynamic lift vector is tilted forward by said control actuation, providing rapid pitch attitude response and dramatically improved acceleration and maneuverability during flight.

The embodiment of the invention depicted in FIG. 9 is of greatly improved performance and employs a fundamentally different aerodynamic principle in its operation than that employed by the devices of the prior art. Referring now to FIG. 9B, the typical arrangement employed by such devices is illustrated wherein a notable contrast in the relative airfoil shapes during control actuation is readily seen. Even though the said prior art devices do not provide independent leading edge camber control means as disclosed by the present invention, nor do their respective inventors claim any specific modes of flight control involving the modification of leading edge camber in flight, persons skilled in the use of such devices nonetheless have recognized the need for several applications, especially in the aforementioned sport parachuting "canopy relative work" application, for some means of directly controlling the lift produced in flight, and commonly employ a means of destroying said lift during flight by retracting the forward risers of the device as shown. During such retraction, the suspension lines 7 attached to said forward risers retract the forward portion of the structure downward in a likewise manner, thereby destroying the convexly curved airfoil shape of the upper surface 16 during said retraction. As previously discussed, the forces required to so distort the ram pressurized structure are relatively much greater than those required by the present invention and increase still further with increasing air speed. The device so distorted derives its increased vertical speed during flight from the employment of a well known aerodynamic "spoiler" principle wherein the lift to drag ratio is substantially degraded by the disruption of the cambered airfoil shape of upper surface 16.

In FIGS. 10 through 14, various embodiments of deployment device bridle load attachment means are illustrated wherein a bridle of any suitable type is employed to transmit a load applied to a gliding parachute device by a deployment device for the purpose of extending and thereby assisting in the deployment of the parachute structure. The various embodiments of said attachment means are employed to distribute said applied bridle loads across the primary structural surfaces of the gliding parachute device.

Referring to FIGS. 10 and 14, a perspective view of the arrangement of one preferred embodiment of the invention and a side detail view of the construction of that embodiment are respectively shown, wherein the bridle load attachment means employed in a typical cell 15 is comprised of a segment of thin reinforcing ribbon 4 of similar elasticity to that of the primary structural material oriented in a generally vertical manner and secured by stitching to a divider 8 so that the lower end of reinforcing ribbon 4 is included in the same attachment means employed to secure the lower edge of said divider to the lower surface segment 1 and the respective upper end of said ribbon is included into the same attachment means employed to secure the upper edge of divider 8 to the upper surface segment 16, whereupon an external strap 21 comprised of a segment of relatively thicker material is secured to the outside of the upper surface 16 along said securing means by stitching arranged so that an unstitched gap of no greater than half of the chordwise width of reinforcing ribbon 4 is provided and located at the center line of the upper end of reinforcing ribbon 4 so that the stitching employed to secure external strap 21 along said securing means extends within the projected edges of reinforcing ribbon 4 and thereby concurrently secures external strap 21 to the upper surface segment 16, the divider 8, and the reinforcing ribbon 4, wherein an attachment link 22 centered in said unstitched gap is contained between the upper surface 16 and said external strap, to which a bridle of any suitable type may be attached.

The invention anticipates that this arrangement may be employed and provide similar advantages in a wide variety of embodiments wherein any vertically oriented structural component is attached to an upper surface. Accordingly, additional embodiments of the invention similar to those disclosed in FIGS. 10 and 14 may be anticipated wherein the reinforcing ribbon 4 illustrated as securing to the centrally positioned divider 8 may be similarly secured to a noncentrally located divider, a rib, or some other auxiliary vertical surface provided for this purpose. Further, the external strap 21 is provided so that an attachment link 22 may be attached to the upper surface 16 and thereby provide a convenient interfacing means between the gliding parachute and various interchangeable forms of deployment devices. In applications where such interchangeability is not required, the embodiment may be further simplified by the elimination of the external strap 21 and the attachment link 22 and the deployment device bridle may be directly secured to the upper surface in place of the said external strap.

Referring to FIG. 13, a side cutaway view of one embodiment is provided showing the typical relative chordwise locations of the bridle load attachment means and the suspension lines attached along the lower surface securing means. On embodiments wherein the bridle load attachment means is secured to a rib, the invention specifically intends that the vertically oriented reinforcing ribbon 4 be located so that its point of attachment along the lower surface 1 is positioned approximately equidistantly between the suspension line attachment means 6 so as to avoid disrupting the desired uniform suspension load stress distributing properties of the primary structural material near the said suspension line attachment means.

Lastly referring to FIGS. 11 and 12, perspective views of other embodiments of the invention providing related means of bridle load attachment show segments of the aforementioned thin reinforcing ribbon 4 of spanwise orientation secured to the upper surface 16 so that their respective spanwise ends are included in the same securing means as that which are employed to attach the upper edges of the respectively adjacent vertical surfaces to said upper surface. The invention anticipates that these said adjacent vertical surfaces may be comprised in the various embodiments by ribs 2, as shown in FIG. 12, by dividers 8, as shown in FIG. 11, by other auxiliary vertical surfaces provided for the purpose, or by various combinations thereof.

What is claimed is:

1. A lifting aerial load suspending device comprising an upper and lower segmented flexible surface of primary structural fabric, each said surface having a leading edge and trailing edge, said surfaces being mutually attached at their respective trailing edges, said surfaces having a plurality of generally vertically disposed airfoil-shaped ribs comprising partitions of various longitudinal extent, said partitions being attached to said surfaces along their respective upper and lower edges at spaced spanwise locations to define a plurality of flexible partitioned cells having openings at the leading edge of the device between the upper and lower surfaces formed by said airfoil-shaped partitions for the inlet of air to provide ram pressurization of the device, each cell being defined by an adjacent pair of ribs of a selected camber height, each rib being comprised of a sheet of flexible material being devoid of externally applied reinforcing members, said ribs being inserted by their lower edges into lower surface securing means of respectively inboard and outboard types, said inboard type lower surface securing means being comprised of mutually interlocking folds of overlapping spanwise edges of two adjacent lower surface segments secured together and extending generally vertically downward from the lower surface, said outboard type lower surface securing means being employed at the spanwise ends of the device and comprised of repeatedly rolled folds of the outermost spanwise edge of the respective outboard lower surface segment secured together and extending generally vertically downward from the lower surface, a plurality of externally applied line attachment means secured in various orientations at various chordwise spaced points along said lower surface securing means, the rib on each spanwise end of the device extending from the leading edge to the trailing edge, each inboard rib extending from the leading edge and terminating at a point of selected percentage of the chord length forward of the trailing edge, and a plurality of suspension lines wherein at least one said line is secured by its respective upper end to each of the said line attachment means and by its lower end to a suspended load.

2. A device as embodied in claim 1 wherein at least one segment of a selected length of thin reinforcing ribbon of similar elasticity to that of the primary structural fabric is contained within at least one of said lower surface securing means.

3. A device as embodied in claim 2 wherein at least one rib inserted into said inboard type securing means extends from the leading edge to the trailing edge of the device.

4. A device as embodied in claim 3 wherein a pair of generally triangular flexible stabilizers are secured by their respective upper edges to the lower surface securing means at each spanwise end of the aerial device and by their lower edges to suspension lines.

5. A device as embodied in claim 4 wherein a plurality of control lines are secured at spaced spanwise locations across the trailing edge of the device.

6. A device as embodied in claim 1 having a plurality of generally vertically disposed airfoil-shaped dividers, said dividers having a leading edge and a trailing edge and further comprising partitions of various vertical and longitudinal extent which attach along their respective upper and lower edges to said upper and lower surfaces at spaced spanwise locations between at least one said adjacent pair of ribs that define a respective cell, each said divider being comprised of a sheet of flexible material extending from the leading edge and terminating at a point of selected chord length forward of the trailing edge, each divider being of a lesser camber height than that of said adjacent pair of ribs and dimensioned so that during pressurization the upper surface of the device attached to the upper edge of said divider shall be constrained in such a manner as to locate itself at a height equal to the camber height of the adjacent ribs.

7. A device as embodied in claim 6 wherein at least one segment of a selected length of thin reinforcing ribbon of similar elasticity to that of the primary structural fabric is contained within at least one of said lower surface securing means.

8. A device as embodied in claim 7 wherein at least one rib inserted into said inboard type securing means extends from the leading edge to the trailing edge of the device.

9. A device as embodied in claim 8 wherein at least one divider extends from the leading edge to the trailing edge of the device.

10. A device as embodied in claim 9 wherein a pair of generally triangular flexible stabilizers are secured by their respective upper edges to the lower surface securing means at each spanwise end of the aerial device and by their lower edges to suspension lines.

11. A device as embodied in claim 10 wherein a plurality of control lines are secured at spaced spanwise locations across the trailing edge of the device.

12. A device as embodied in claim 1 having a plurality of generally vertically disposed airfoil-shaped dividers, said dividers having a leading edge and a trailing edge and further comprising partitions of various vertical and longitudinal extent which attach along their respective upper and lower edges to said upper and lower surfaces at spaced spanwise locations between at least one said adjacent pair of ribs that define a respective cell, each said divider being comprised of a sheet of flexible material extending from the leading edge and terminating at a point of selected chord length forward of the trailing edge, said dividers being arranged in pairs of respectively equal camber height whereby both are of a lesser camber height than that of said adjacent pair of ribs, said pairs of dividers being dimensioned so that during pressurization the upper surface of the device attached to the upper edges of said dividers shall be constrained in such a manner as to locate itself at a height equal to the camber height of the adjacent ribs.

13. A device as embodied in claim 12 wherein at least one segment of a selected length of thin reinforcing ribbon of similar elasticity to that of the primary structural fabric is contained within at least one of said lower surface securing means.

14. A device as embodied in claim 13 wherein at least one rib inserted into said inboard type securing means extends from the leading edge to the trailing edge of the device.

15. A device as embodied in claim 14 wherein at least one divider extends from the leading edge to the trailing edge of the device.

16. A device as embodied in claim 15 wherein a pair of generally triangular flexible stabilizers are secured by their respective upper edges to the lower surface securing means at each spanwise end of the aerial device and by their lower edges to suspension lines.

17. A device as embodied in claim 16 wherein a plurality of control lines are secured at spaced spanwise locations across the trailing edge of the device.

18. A device as embodied in claim 1 having a plurality of generally vertically disposed airfoil-shaped dividers, said dividers having a leading edge and a trailing edge and further comprising partitions of various vertical and longitudinal extent which attach along their respective upper and lower edges to said upper and lower surfaces at spaced spanwise locations between at least one said adjacent pair of ribs that define a respective cell, each said divider being comprised of a sheet of flexible material extending from the leading edge and terminating at a point of selected chord length forward of the trailing edge, said dividers being arranged in groups of three in each cell whereby the centermost divider is of respectively small camber height and is located between a pair of dividers of a respectively equal camber height which is both relatively greater than that of the centermost divider and relatively less than that of said adjacent pair of ribs, said dividers being dimensioned so that during pressurization the upper surface of the device attached to the upper edges of said dividers shall be constrained in such a manner as to locate itself at a height equal to the camber height of the adjacent ribs.

19. A device as embodied in claim 18 wherein at least one segment of a selected length of thin reinforcing ribbon of similar elasticity to that of the primary structural fabric is contained within at least one of said lower surface securing means.

20. A device as embodied in claim 19 wherein at least one rib inserted into said inboard type securing means extends from the leading edge to the trailing edge of the device.

21. A device as embodied in claim 20 wherein at least one divider extends from the leading edge to the trailing edge of the device.

22. A device as embodied in claim 21 wherein a pair of generally triangular flexible stabilizers are secured by their respective upper edges to the lower surface securing means at each spanwise end of the aerial device and by their lower edges to suspension lines.

23. A device as embodied in claim 22 wherein a plurality of control lines are secured at spaced spanwise locations across the trailing edge of the device.

24. A lifting aerial load suspending device comprising an upper and lower flexible surface and having a plurality of generally vertically disposed airfoil-shaped dividers and ribs comprising partitions of selected longitudinal extent which attach to said surfaces along their respective upper and lower edges at spaced spanwise locations to define a plurality of flexible partitioned cells, said upper and lower surfaces having a leading edge and a trailing edge, each said divider and rib being comprised of a sheet of flexible material extending from the leading edge toward the trailing edge of the device, each cell being defined by an adjacent pair of ribs of a selected camber height, each of said ribs having suspension line attachment means attached at chordwise intervals along their respective lower edges, each of said dividers being devoid of said suspension line attachment means and located between at least one adjacent pair of ribs that define a respective cell, wherein each divider is of a lesser camber height than that of said adjacent pair of ribs and dimensioned so that during pressurization the upper surface of the device attached to the upper edge of said divider shall be constrained in such a manner as to locate itself at a height equal to the camber height of the adjacent ribs.

25. A lifting aerial load suspending device as claimed in claim 24, wherein said dividers are arranged in pairs of a respectively equal camber height which is less than the camber height of said adjacent pair of ribs, said pairs of dividers being dimensioned so that during pressurization the upper surface of the device attached to the upper edges of said dividers shall be constrained in such a manner as to locate itself at a height equal to the camber height of the adjacent ribs.

26. A lifting aerial load suspending device as claimed in claim 24, wherein said dividers are arranged in groups of three in each cell whereby the centermost divider is of respectively smallest camber height and is located between a pair of dividers of a respectively equal camber height which is both relatively greater than that of the centermost divider and relatively less than that of said adjacent pair of ribs, said dividers being dimensioned so that during pressurization the upper surface of the device attached to the upper edges of said dividers shall be constrained in such a manner as to locate itself at a height equal to the camber height of the adjacent ribs.

27. A lifting aerial load suspending device comprising an upper and lower flexible surface of primary structural fabric and having a plurality of generally vertically disposed airfoilshaped dividers and ribs comprising partitions of selected longitudinal extent which attach to said surfaces along their respective upper and lower edges at spaced spanwise locations to define a plurality of flexible partitioned cells, said upper and lower surfaces having a leading edge and a trailing edge, each said divider and rib being comprised of a sheet of flexible material extending from the leading edge toward the trailing edge of the device, each cell being defined by an adjacent pair of ribs of a selected camber height, each of said ribs having suspension line attachment means attached at chordwise intervals along their respective lower edges, each of said dividers being devoid of said suspension line attachment means and located between at least one adjacent pair of ribs that define a respective cell, said device having a deployment device bridle attachment means comprising at least one segment of thin reinforcing ribbon of relatively similar elasticity to that of the primary structural fabric secured to the upper surface in a generally spanwise orientation at locations of selected percentage of chord length aft of the leading edge so that the spanwise ends of said attachment means are included into the same securing means employed to secure the respective adjacent said ribs or dividers to said upper surface.

28. A lifting aerial load suspending device comprising an upper and lower flexible surface of primary structural fabric and having a plurality of generally vertically disposed airfoil-shaped dividers and ribs comprising partitions of selected longitudinal extent which attach to said surfaces along their respective upper and lower edges at spaced spanwise locations to define a plurality of flexible partitioned cells, said upper and lower surfaces having a leading edge and a trailing edge, each said divider and rib being comprised of a sheet of flexible material extending from the leading edge toward the trailing edge of the device, each cell being defined by an adjacent pair of ribs of a selected camber height, each of said ribs having suspension line attachment means attached at chordwise intervals along their respective lower edges, each of said dividers being devoid of said suspension line attachment means and located between at least one adjacent pair of ribs that define a respective cell, said device having a deployment device bridle attachment means comprising at least one segment of thin reinforcing ribbon of relatively similar elasticity to that of the primary structural fabric secured to the surface of one or more said ribs or dividers in a generally vertical orientation at locations of selected percentage of chord length aft of the leading edge of the device so that the upper ends of said attachment means are included into the same securing means employed to secure the respective upper edges of said ribs or dividers to the upper surface and that the respective lower ends are included into the same securing means employed to secure the respective lower edges of said ribs or dividers to the lower surface and so that the said reinforcing ribbon joins said lower surface securing means at respective chordwise locations that are devoid of any concurrently secured external line attachment means.

* * * * *